(12) United States Patent
Rune et al.

(10) Patent No.: US 9,510,331 B2
(45) Date of Patent: Nov. 29, 2016

(54) DATA TRANSMISSION USING SHARED UPLINK CONTROL CHANNEL RESOURCE

(75) Inventors: Johan Rune, Lidingö (SE); Erik Eriksson, Linköping (SE); Riikka Susitaival, Helsinki (FI)

(73) Assignee: Telefonaktiebolaget L M Ericsson, Stockholm (SE)

( * ) Notice: Subject to any disclaimer, the term of this patent is extended or adjusted under 35 U.S.C. 154(b) by 59 days.

(21) Appl. No.: 14/396,353

(22) PCT Filed: Apr. 27, 2012

(86) PCT No.: PCT/EP2012/057832
§ 371 (c)(1),
(2), (4) Date: Apr. 13, 2015

(87) PCT Pub. No.: WO2013/159830
PCT Pub. Date: Oct. 31, 2013

(65) Prior Publication Data
US 2015/0223228 A1    Aug. 6, 2015

(51) Int. Cl.
*H04W 72/04* (2009.01)
*H04W 52/02* (2009.01)
*H04W 72/12* (2009.01)
*H04W 8/26* (2009.01)
*H04W 88/02* (2009.01)

(52) U.S. Cl.
CPC ..... *H04W 72/0413* (2013.01); *H04W 52/0209* (2013.01); *H04W 72/1278* (2013.01); *H04W 8/26* (2013.01); *H04W 72/121* (2013.01); *H04W 88/02* (2013.01)

(58) Field of Classification Search
None
See application file for complete search history.

(56) References Cited

U.S. PATENT DOCUMENTS

| 8,351,456 B2 * | 1/2013 | Kadous | H04W 72/1215 370/338 |
| 2008/0311919 A1 | 12/2008 | Whinnett et al. | |
| 2009/0041240 A1 * | 2/2009 | Parkvall | H04W 74/004 380/247 |

(Continued)

FOREIGN PATENT DOCUMENTS

WO  WO 2007/126302 A1  11/2007
WO  WO 2010/018942     2/2010

(Continued)

OTHER PUBLICATIONS

International Search Report for International Application No. PCT/EP2012/057832 mailed Nov. 7, 2012, 4 pages.

(Continued)

*Primary Examiner* — Mohammad Adhami
(74) *Attorney, Agent, or Firm* — Myers Bigel, PA

(57) ABSTRACT

In data transmission between a mobile network and a terminal device an uplink control channel resource is allocated to the terminal device and to at least one further terminal device. Further, a shared identifier is assigned to both the terminal device and the at least one further terminal device. Using the allocated uplink control channel resource, the mobile network receives a scheduling request from the terminal device. In response to receiving the scheduling request, the mobile network sends an uplink grant. The uplink grant is addressed by the shared identifier to the terminal device and to the at least one further terminal device. Further, the mobile network receives uplink data from the terminal device, which is accomplished on uplink resources indicated by the uplink grant.

22 Claims, 11 Drawing Sheets

(56) References Cited

U.S. PATENT DOCUMENTS

| | | | |
|---|---|---|---|
| 2009/0221281 A1* | 9/2009 | Tseng | H04W 72/1284 455/423 |
| 2010/0040005 A1* | 2/2010 | Kim | H04J 11/0069 370/329 |
| 2010/0284354 A1* | 11/2010 | Ostergaard | H04W 72/1284 370/329 |
| 2011/0176500 A1* | 7/2011 | Wager | H04W 74/006 370/329 |
| 2013/0155894 A1* | 6/2013 | Li | H04W 74/0833 370/252 |

FOREIGN PATENT DOCUMENTS

| | | |
|---|---|---|
| WO | WO 2010/085187 A1 | 7/2010 |
| WO | WO2011150766 * | 8/2011 |
| WO | WO 2012/041363 A1 | 4/2012 |

OTHER PUBLICATIONS

Written Opinion of the International Searching Authority for International Application No. PCT/EP2012/057832 mailed Nov. 7, 2012, 5 pages.

International Preliminary Report on Patentability for International Application No. PCT/EP2012/057832 mailed May 30, 2014, 7 pages.

* cited by examiner

DATA TRANSMISSION USING SHARED UPLINK CONTROL CHANNEL RESOURCE

CROSS REFERENCE TO RELATED APPLICATION

This application is a 35 U.S.C. §371 national stage application of PCT International Application No. PCT/EP2012/057832, filed on 27 Apr. 2012, the disclosure and content of which is incorporated by reference herein in its entirety. The above-referenced PCT International Application was published in the English language as International Publication No. WO 2013/159830 Al on 31 Oct. 2013.

TECHNICAL FIELD

The present invention relates to methods for data transmission between a mobile network and multiple terminal devices and to corresponding devices.

BACKGROUND

In mobile networks, such as a 3GPP (Third Generation Partnership Project) mobile network, various types of terminal devices may be used. For example, Machine Type Communication (MTC) terminal devices may be used in addition to conventional types of terminal devices, such as mobile phones, smartphones, data modems, mobile computers, or the like. In the following a terminal device of any type may also be termed as user equipment (UE). MTC terminal devices typically transmit and receive only small amounts of data, which may occur more or less infrequently, e.g., once per week to once per minute. MTC terminal devices may also be polled for data, resulting in an irregular pattern of data transmission. MTC terminal devices are typically assumed to be autonomous sensor devices, alarm devices, actuator devices, remote control devices, or the like, which communicate with application servers, rather than being used for communication by a human user. Hence, this type of communication may also be referred to as machine-to-machine (M2M) communication and the devices may be denoted machine devices (MDs). An application server may in turn configure the MTC terminal device and receive data from them. The application server may be within or outside the mobile network.

Considering the above, MTC terminal devices are typically characterized by a modest bit rate and sparse communication. MTC terminal devices may therefore be implemented with low-performance data transmission capabilities. Further, MTC devices typically need to be very energy efficient, since external power supplies may not be available and/or it may be practically or economically not feasible to frequently replace or recharge their batteries.

A known way of energy saving in a UE, which may also be applied to MTC devices, is to use Discontinuous Reception (DRX). By means of DRX, a UE can enter an energy efficient sleep mode when no data transmission is needed. In the sleep mode receiver circuitry of the UE may be turned off. DRX can be used in idle mode or in connected mode.

However, using DRX in idle mode requires a UE to re-establish its connection to the mobile network every time it needs to transmit some data. This may cause undesirable signaling overhead and also excessively consume energy in the UE. Such idle-to connected mode transitions and associated signaling can be avoided by using DRX in connected mode. However, keeping a large number of UEs in connected mode may require a significant amount of resources of an uplink (UL) control channel, e.g., of the Physical UL Control Channel (PUCCH) as used in 3GPP LTE (Long Term Evolution).

The UL control channel may be used for supporting efficient connected mode operation. For example, the UE may use allocated resources of the UL control channel for scheduling requests, i.e., requests for resources for UL transmissions. Further, the UL control channel may also be used for reporting channel conditions, e.g., in terms of a Channel Quality Indicator (CQI), or for providing feedback of a retransmission protocol, e.g., of a Hybrid Automatic Repeat Request (HARQ) protocol, with respect to downlink (DL) transmissions.

Accordingly, there is a need for techniques which allow for efficiently maintaining a connection to multiple terminal devices.

SUMMARY

According to an embodiment of the invention, a method of data transmission between a mobile network and a terminal device is provided. According to the method, a node of the mobile network allocates a UL control channel resource to the terminal device and to a further terminal device. Further, the node assigns a shared identifier to both the terminal device and the further terminal device. Using the allocated UL control channel resource, the node receives a scheduling request from the terminal device. In response to receiving the scheduling request, the node sends an UL grant. The UL grant is addressed by the shared identifier to the terminal device and to the further terminal device. Further, the node receives UL data from the terminal device, which is accomplished on UL resources indicated by the UL grant.

According to a further embodiment of the invention, a method of data transmission between a mobile network and a terminal device is provided. According to the method, the terminal device receives an allocation of a UL control channel resource from the mobile network.

Further, the terminal device receiving an indication that the UL control channel resource is additionally allocated to a further terminal device. Using the allocated UL control channel resource, the terminal device sends a scheduling request to the mobile network. In response to the scheduling request, the terminal device receives an UL grant. The UL grant is addressed to the terminal device by a shared identifier assigned both to the terminal device and to the further terminal device.

According to a further embodiment of the invention, a network node is provided. The network node comprises an interface for data transmission between a mobile network and a terminal device and a processor. The processor is configured to control the network node to:

allocate an UL control channel resource to the terminal device and to a further terminal device, assign a shared identifier to both the terminal device and the further terminal device, using the allocated UL control channel resource, receive a scheduling request from the terminal device, in response to receiving the scheduling request, send an UL grant, the uplink grant being addressed by the shared identifier to the terminal device and to the further terminal device, and receive UL data from the terminal device on UL resources indicated by the uplink grant.

According to a further embodiment of the invention, a terminal device is provided. The terminal device comprises a radio interface for data transmission between a mobile network and the terminal device and a processor. The processor is configured to control the terminal device to:

receive an allocation of an UL control channel resource from the mobile network, receive an indication that the UL control channel resource is additionally allocated to a further terminal device, using the allocated UL control channel resource, send a scheduling request to the mobile network, and in response to the scheduling request, receive an UL grant addressed to the terminal device by a shared identifier assigned both to the terminal device and to the further terminal device.

DETAILED DESCRIPTION OF EMBODIMENTS

In the following, the invention will be explained in more detail by referring to exemplary embodiments and to the accompanying drawings. The illustrated embodiments relate to concepts for data transmission between a mobile network and multiple terminal devices.

Figure 1:
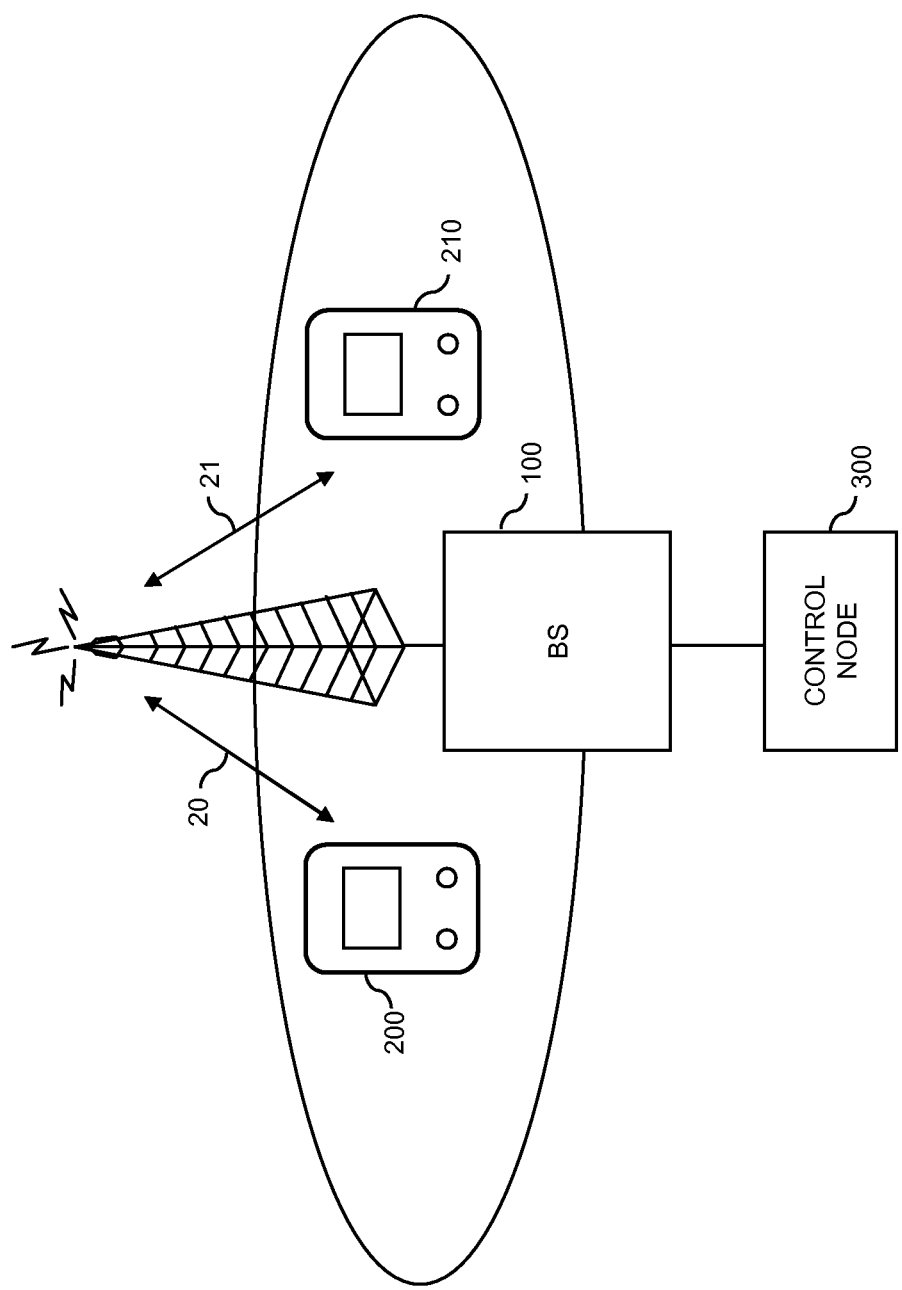
FIG. 1 schematically illustrates a mobile network environment in which concepts according to embodiments of the invention can be applied.

FIG. 1 schematically illustrates a mobile network environment, i.e., infrastructure of a mobile network, represented by a base station (BS) 100 and a control node 300, as well as terminal devices 200, 210 which may connect to the mobile network for data transmission, e.g., for reception of DL data from the BS 100 and/or for sending of UL data to the BS 100, as illustrated by arrows 20, 21. This data transmission may in particular involve using an UL control channel for transmission of control data from the terminal devices 200, 210 to the mobile network. The UL control channel is common to all terminal devices within the same cell.

The mobile network may be implemented according to the 3GPP Evolved Packet System (EPS) technical specifications. In this case, the radio access network part of the mobile network is often referred to as Long Term Evolution (LTE) radio access network. In such an LTE scenario, the BS 100 may be an Evolved Universal Terrestrial Radio Access Network (E-UTRAN) Node B (eNB), and the control node 300 may be a Mobility Management Entity (MME). The UL control channel may then be a PUCCH. If the mobile network is implemented as a Universal Mobile Telecommunications System (UMTS) network, optionally implementing High Speed Packet Access (HSPA), the BS 100 may be a Node B (NB), and the control node 300 may be a Radio Network Controller (RNC). In the latter scenario, the UL control channel may be an Enhanced Dedicated Channel (E-DCH) Dedicated Physical Control Channel (DPCCH), also referred to as E-DPCCH. The terminal devices 200, 210 may be MTC terminal devices or some other type of UE.

According to concepts as described herein, multiple terminal devices, e.g., the terminal devices 200, 210, may share resources of the UL control channel. In other words, a resource of the UL control channel may be allocated to both the terminal device 200 and to the terminal device 210. The resource may for example be defined in terms of a timeslot, a frequency band, a phase rotation and/or a code sequence. By sharing the resources of the UL control channel, the connected mode may be efficiently maintained for a large number of terminal devices, thereby avoiding frequent transitions between connected mode and idle mode.

Figure 2:
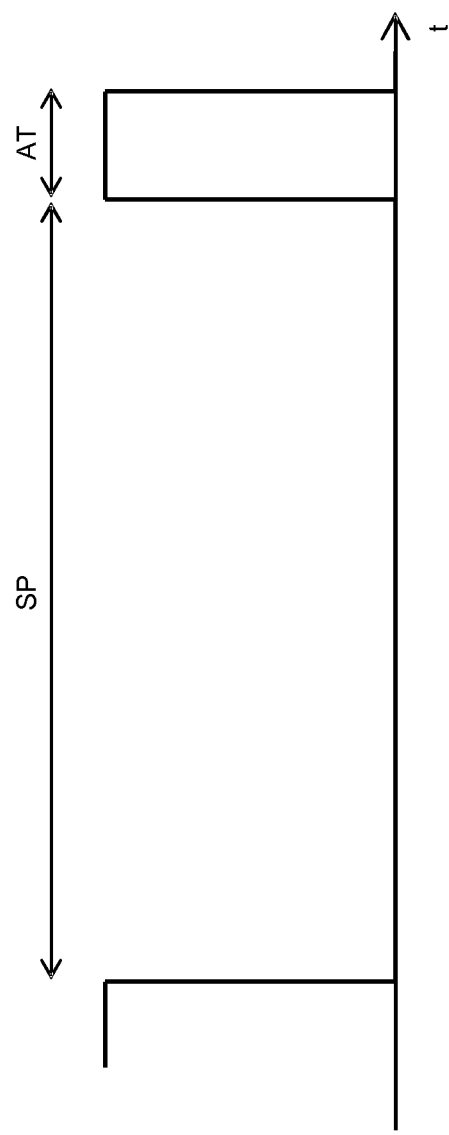
FIG. 2 schematically illustrates a DTX/DRX cycle which may be used in an embodiment of the invention.

The sharing of resources is particularly efficient if the terminal devices sparsely utilize the UL control channel, e.g., due to using Discontinuous Transmission (DTX) and/or DRX. When using DTX and/or DRX the terminal devices will enter a sleep mode according to a DRX/DTX cycle as schematically illustrated in FIG. 2. As illustrated in FIG. 2, the DTX/DRX cycle includes a sleep period SP and an active time. During the sleep period SP, the terminal device 200, 210 is in a sleep mode. During the active time the terminal device 200, 210 is not in the sleep mode. For implementing DRX, the terminal device 200, 210 may stop monitoring certain DL channels transmitted by the BS 100 while being in the sleep mode. Such DL channels may in particular include a DL control channel, e.g., a Physical Downlink Control Channel (PDCCH) according to 3GPP LTE. For implementing DTX, the terminal device 200, 210 may stop transmitting on certain UL channels while being in the sleep mode. Such UL channels may in particular include the UL control channel. Accordingly, while one of the terminal devices 200, 210 is in the DTX sleep mode, it will typically not use its allocated resources of the UL control channel so that these resources can be used by the other terminal devices.

However, sharing of resources of the UL control channel by multiple terminal devices 200, 210 may cause ambiguities concerning the source of a certain transmission on the UL control channel. For example, if the transmission on a shared resource of the UL control channel includes a scheduling request, the mobile network should respond to the scheduling request by sending an UL grant to the terminal device which issued the scheduling request. However, due to the resource sharing on the UL control channel, this terminal device cannot be uniquely identified from the resource of the UL control channel on which the scheduling request was received by the mobile network. According to the concepts as explained herein, this situation may be addressed by using a shared identifier to address the UL grant to the terminal devices 200, 210 sharing the resource. For example, if the resource of the UL control channel is shared by the terminal devices 200, 210, the shared identifier would be assigned to the terminal devices 200, 210, and the UL grant would be addressed to both the terminal device 200 and to the terminal device 210. Upon receiving the UL grant, the terminal device which actually sent the scheduling request may then send UL data on the resources indicated by the UL grant. The mobile network may then resolve the ambiguity on the basis of the transmission of the UL data, e.g., by utilizing an identifier that the transmitting terminal device 200, 210 may include in the UL data, e.g., a Cell Radio Network Temporary Identifier (C-RNTI). This identifier may be cell-unique, i.e., assigned to only one terminal device of the same cell. Alternatively or in addition the ambiguity may also be resolved by utilizing a phase rotation pattern of demodulation reference symbols used for transmission of the UL data, and/or a scrambling sequence used for transmission of the UL data. The shared identifier may be a C-RNTI which is simultaneously assigned to the different terminal devices.

Figure 3:
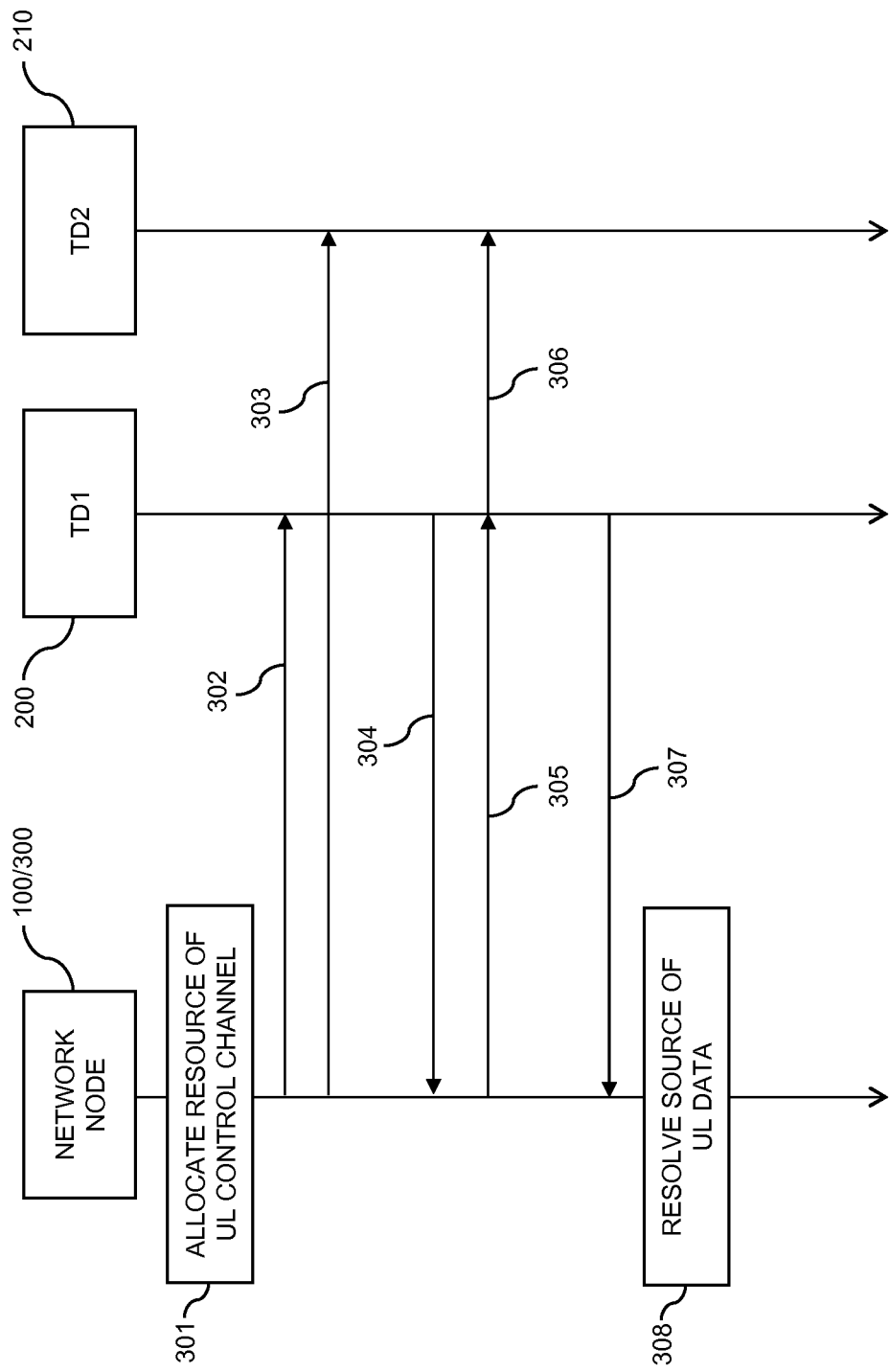
FIG. 3 shows a timing diagram for illustrating exemplary procedures according to an embodiment of the invention.

Exemplary procedures which are based on the above concepts are illustrated in FIG. 3. The procedures of FIG. 3 involve a network node, e.g., the BS 100 or the control node 300, the terminal device 200, and the further terminal device 210. It is assumed that the network node is responsible for allocating resources to be used for data transmission to or from the terminal devices 200, 210. As mentioned above, the terminal device 200 and/or the terminal device 210 may use DTX and/or DRX, which in turn may result in a relatively sparse communication with the mobile network. Further, the resource sharing of the UL control channel may be supported by configuring the terminal devices to use aperiodic channel status reporting, also referred to as trigger-based status reporting, such that the terminal devices will transmit a channel status report only upon an explicit request by the mobile network. Alternatively, periodic sending of channel status reports on the UL control channel can be coordinated between the different terminal devices, such that different terminal devices do not attempt to send channel status reports simultaneously.

At step 301, the network node 100/300 allocates a resource of an UL control channel to both the terminal device 200 and to the terminal device 210. The resource may for example be defined in terms of a timeslot, one or more frequencies or frequency bands, a phase rotation, and/or a code sequence to be used for transmission on the UL control channel. Further, the network node 100/300 also assigns a shared identifier to both the terminal device 200 and to the further terminal device 210. The shared identifier may be a shared C-RNTI. In some scenarios, a Semi-Persistent Scheduling (SPS)-C-RNTI may be used as the shared identifier.

By message 302, the network node 100/300 may inform the terminal device 200 of the allocated resource of the UL control channel. Similarly, the network node 100/300 may use message 303 to inform the further terminal 210 of the allocated resource of the UL control channel. The messages 302, 303 can for example be messages of a Radio Resource Control (RRC) protocol. The messages 302 and 303 may also be used to notify the terminal devices 200, 210 of the assignment of the shared identifier.

With message 304, the terminal device 200 may then send a scheduling request to the network node 100/300. This is accomplished on the resource allocated at step 301. The scheduling request of message 304 is received by the network node 100/300.

In response to the received scheduling request, the network node 100/300 sends a message 305/306 including an UL grant. By means of the shared identifier, the message 305/306 is addressed to both the terminal device 200 and to the further terminal device 210. The UL grant is received by both the terminal device 200 and the further terminal device 210. However, in the terminal device 210, which did not send a scheduling request, the UL grant may be ignored, i.e., the further terminal device 210 may refrain from performing an UL transmission in response to receiving the UL grant of message 306. Here, it should be noticed that some standards define that a UE which receives an UL grant but has no UL data to transmit should send a Buffer Status Report (BSR). In the present concepts such sending of a BSR may be suppressed for example by corresponding control signaling. For example, the terminal device 200 and/or 210 could be configured by RRC signaling, e.g., by a RRC Connection Setup message or a RRC Connection Reconfiguration message, whether to send a BSR or not. Further, a flag or other indicator in the UL grant could be used to indicate whether to send a BSR or not. As another example it would be possible to require that a terminal device 200, 210 receiving an unsolicited UL grant addressed to a shared identifier generally suppresses the sending of the BSR, thereby avoiding explicit configuration through signaling. In some scenarios, it may also be assumed that the terminal device 210 which did not send the scheduling request is most likely in DTX/DRX sleep mode and therefore will not receive the UL grant anyway.

In accordance with the UL grant, i.e., by utilizing resources of an UL data channel indicated by the UL grant, the terminal device 200 may then send UL data 307 to the network node 100/300. The UL data channel may for example be a Physical Uplink Shared Channel (PUSCH) according to 3GPP LTE. With the UL data 307, the terminal device 200 may further transmit an identifier which enables the network node 100/300 to distinguish whether the UL data 307 originate from the terminal device 200 or from the further terminal device 210. This identifier can be a C-RNTI, in particular a cell-unique C-RNTI. The identifier can be included in a Medium Access Control (MAC) Control Element, e.g., the C-RNTI MAC Control Element. Typically, the identifier is different from the shared identifier. However, in some scenarios, it is also possible that the terminal device 200 utilizes the same identifier as the shared identifier. For example, the shared identifier may be assigned to both the terminal device 200 and to the terminal device 210. Further, a dedicated identifier, e.g., a C-RNTI, may be assigned to the further terminal device 210 only. If the terminal device 200 sends the UL data 307 as illustrated in FIG. 3, the terminal device 200 may include the shared identifier in the UL data. As compared to that, if the further terminal device 210 sends UL data (not illustrated in FIG. 3), it would include its dedicated identifier into the UL data. Accordingly, by distinguishing whether the shared identifier or the dedicated identifier is transmitted with the UL data, the network node 100/300 can resolve from which one of the terminal devices 200, 210 the UL data originate. Of course, it would also be possible to assign a dedicated identifier, e.g., a cell-unique C-RNTI, to the terminal device 200 as well, which could then be transmitted together with the UL data to allow for resolving the source of the UL data 307.

At step 308, the network node 100/300 resolves the source of the UL data, in the illustrated example the terminal device 200. As mentioned above, this may be accomplished on the basis of the identifier transmitted together with the UL data. Alternatively or in addition, this could also be based a phase rotation pattern of demodulation reference symbols used for transmission of the UL data 307, and/or a scrambling sequence used for transmission of the UL data 307. Such phase rotation pattern or scrambling sequence may be unique for each terminal device in the same cell, e.g., by deriving the phase rotation pattern or scrambling sequence from a cell-unique C-RNTI.

In the above procedures, it can be utilized that there is only a small probability that two scarcely communicating terminal devices, which have been allocated the same resource of the UL control channel, will attempt to use the shared resource simultaneously. The use of random access procedures for transmitting scheduling requests can be avoided and idle to connected mode transitions can be avoided without excessive resource allocation for UL control channel usage and without depleting the resources available for UL control channel allocation. If nonetheless a collision occurs, resulting in that a terminal device fails to receive a requested UL grant, the terminal device may retransmit the scheduling request, e.g., after a random time period. Further, if the source of the received UL data is for some reason not correctly resolved by the mobile network, this may be detected by the terminal device, e.g., by the absence of feedback as required by a retransmission protocol. Additionally or alternatively, higher protocol layers may be used to handle data loss due to a collision.

In some scenarios, the network node 100/300 may also revoke the assignment of the shared identifier if the resource of the UL control channel ceases to be shared. For one of the terminal devices, the shared identifier may then be maintained as dedicated identifier of the terminal device.

Figure 4:
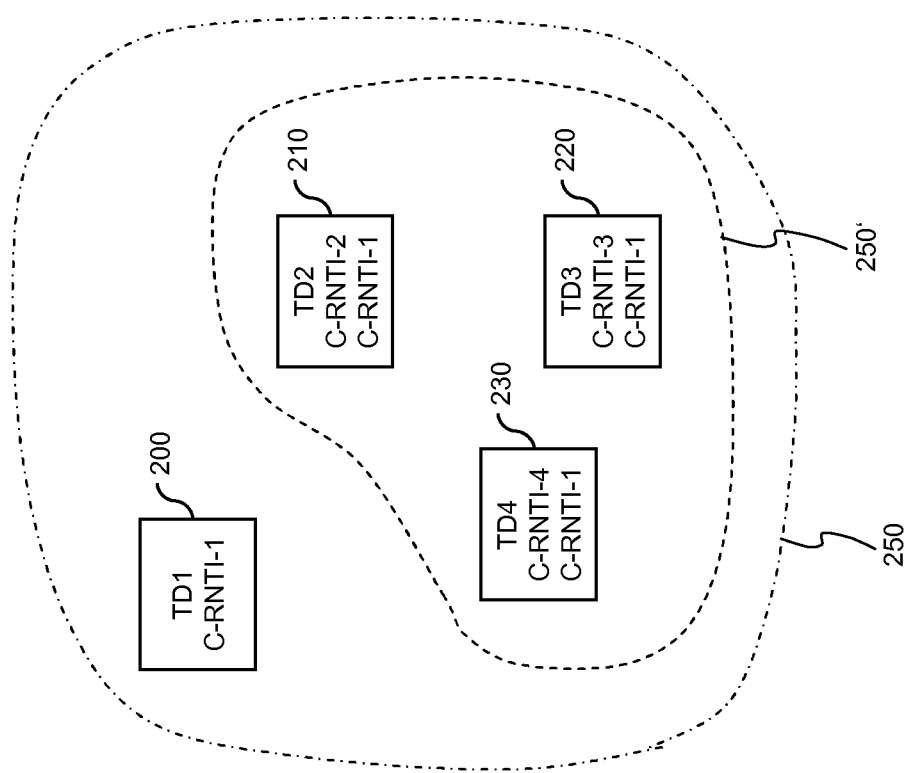
FIG. 4 shows an exemplary scenario of assigning a shared identifier to a plurality of terminal devices.

An exemplary scenario of assigning a shared identifier to multiple terminal devices 200, 210, 220, 230 of a group 250 is illustrated in FIG. 4. In the example of FIG. 4, it is assumed that the terminal devices 200, 210, 220, 230 share the same resource of the UL control channel. Accordingly, the shared identifier is assigned to all the terminal devices 200, 210, 220, 230 of the group. In the example of FIG. 4, the shared identifier is a C-RNTI, referred to as C-RNTI 1.

As further illustrated the terminal devices 210, 220, 230 of subgroup 250' are each provided with a dedicated identifier which allows for distinguishing between the terminal devices 200, 210, 220, 230 of the group 250 by including the dedicated identifier into UL data transmitted by the respective terminal device. In the illustrated example, the dedicated identifiers are C-RNTIs as well, referred to as C-RNTI-2 (assigned to terminal device 210), C-RNTI-3 (assigned to terminal device 220), and C-RNTI-3 (assigned to terminal device 230). For the terminal device 200, the shared identifier may be used in a similar fashion as the dedicated identifiers of the terminal devices 210, 220, 230, i.e., it may be included into the UL data transmitted by the terminal device 200.

As can be seen, one of the terminal devices 200, 210, 220, 230 in the group 250 sharing the same resource of the UL control channel may be treated differently in terms of allocating the shared and the dedicated identifier. In the example of FIG. 4, only the shared identifier is allocated to the terminal device 200, whereas to the other terminal devices 210, 220, 230 of the group 250 are further provided with their respective dedicated identifiers. The terminal device 200 does not need to be aware that its identifier 200 is shared by the other terminal devices 210, 220, 230 and rather use it in the same fashion as a conventional C-RNTI. Hence, the sharing of the resource of the UL control channel may be implemented in a transparent manner with respect to the terminal device 200, thereby facilitating implementation of the concepts in connection with legacy terminal devices, e.g., in accordance with the LTE Release 8 Technical Specifications. This means that the terminal device 200 may also refrain from sending its C-RNTI together with the UL data. In such a scenario, the mobile network, e.g., the BS 100 or the control node 300, may interpret the absence of the C-RNTI in the UL data as indication that the terminal device 200 is the source of the UL data.

The above-described different treatment of one of the terminal devices in the group sharing the same resource of the UL control channel may be used to simplify management of the resource sharing. For example, when considering the example of FIG. 4, the terminal device 200 may temporally be the first to which the resource of the UL control channel is allocated. The mobile network may then allocate the C-RNTI-1 in a usual manner to the terminal device 200. If then the number of terminal devices increases and resource sharing is used, a further terminal device, e.g., the terminal device 210, may be allocated the same resource of the UL control channel. This further terminal device may then be allocated a dedicated C-RNTI, e.g., the C-RNTI-2, and a shared C-RNTI which is identical to the C-RNTI-1 of the terminal device 200. In a similar manner, the resource sharing can be extended to further terminal devices, e.g., the terminal devices 220, 230. In this way, it can be avoided that two identifiers need to be allocated to the first terminal device 200 of the group, thereby allowing to avoid signaling to this terminal device 200 when its allocated resource of the UL control channel becomes shared.

In some scenarios, application of the resource sharing of the UL control channel to legacy terminal devices may be accomplished by using an SPS-C-RNTI as the shared identifier. In this scenario, the network node 100/300 may configure the terminal devices sharing the same resource of the UL control channel in such a way that the legacy terminal device or each legacy terminal device uses a phase rotation pattern of demodulation reference symbols and/or a scrambling sequence for the transmission of UL data which is unique within the group of terminal devices sharing the resource. On the basis of the phase rotation pattern and/or scrambling sequence, the legacy terminal device can be identified as the source of the transmitted UL data. Non-legacy terminal devices may operate as explained above, e.g., include their respective dedictated identifier into the UL data or identify themselves through a phase rotation pattern of demodulation reference symbols and/or a scrambling sequence.

In the above scenario, the legacy terminal device treats a resource allocation, in particular an UL grant, addressed to the shared identifier as a semi-persistent resource allocation. In order to avoid that the legacy terminal device attempts to use the allocated resource repeatedly, the network node 100/300 may send an SPS release indication after the first use of the allocated resource. A non-legacy terminal device in the group sharing the resource of the UL control channel may in turn be configured to treat the SPS-C-RNTI as the shared identifier and ignore the SPS release indication.

The network node 100/300 may consider the dual interpretation of the SPS-C-RNTI when assigning the shared identifier or withdrawing the assignment of the shared identifier. In one scenario, the legacy terminal device is the first one to share the SPS-C-RNTI and the other terminal devices, which are subsequently added to the group, are non-legacy terminal devices. In this case, the network node may assign the SPS-C-RNTI of the legacy terminal device as shared identifier to the non-legacy terminal devices. In a further scenario, the legacy terminal device is added to an already existing group of terminal devices sharing the same resource of the UL control channel. In this scenario, the shared identifier is already assigned to these terminal devices. The network node 100/300 may then assign a new SPS-C-RNTI to the legacy terminal device, e.g., through a RRC Connection Reconfiguration message. This SPS-C-RNTI is selected by the network node 100/300 to coincide with the shared identifier of the other terminal devices.

When the shared SPS-C-RNTI is no longer needed and its assignment is revoked, the network node 100/300 may consider further usage of the SPS-C-RNTI for semi-persistent scheduling. For example, if there was only one legacy terminal device in the group, this legacy terminal device may keep the SPS-C-RNTI. If there were multiple legacy terminal devices in the group, the assignment of the SPS-C-RNTI may be revoked and/or replaced with a cell-unique new SPS-C-RNTI for all but one of them.

In addition, if a legacy terminal device is removed from the group sharing the SPS-C-RNTI and the group as such persists, i.e., there are at least two further terminal devices left sharing the SPS-C-RNTI, then the network node 100/300 may revoke the assignment of the SPS-C-RNTI to the removed legacy terminal device and optionally assign a cell-unique new SPS-C-RNTI to the removed legacy terminal, irrespective of whether there is a legacy terminal device left in the group or not.

As mentioned above, in some scenarios the terminal devices sharing the same resource of the UL control channel may use DTX, which may be implemented in addition to or as an extension of DRX. In such scenarios, efficiency of resource sharing can be further improved by coordination of the respective DTX/DRX cycles of the terminal devices, taking advantage from the fact that the terminal device will not send scheduling requests on the UL control channel while being in DTX sleep mode. For implementing this behaviour, the terminal devices may be configured to refrain from sending scheduling requests while being in DTX sleep mode. Further, the terminal devices may also be configured to refrain from sending channel status reports on the UL control channel while being in DTX sleep mode, e.g., Channel Status Information (CSI) including a CQI, a Rank Indicator (RI), and/or a Precoder Matrix Indicator (PMI). Such configurations may for example be accomplished using RRC signaling or may be part of preconfigured DTX features. Channel status reports may also be suppressed by configuring the terminal devices to use aperiodic channel status reporting. In the latter case the terminal device will transmit a channel status report only upon an explicit request by the mobile network. Such a request may be transmitted together with an UL grant, which means that typically resources on an UL data channel are available, which can be used for sending the channel status report, so that sending of the channel status report on the UL control channel can be avoided. Alternatively, periodic sending of channel status reports on the UL control channel can be coordinated between the different terminal devices, such that different terminal devices do not attempt to send channel status reports simultaneously.

Figure 5:
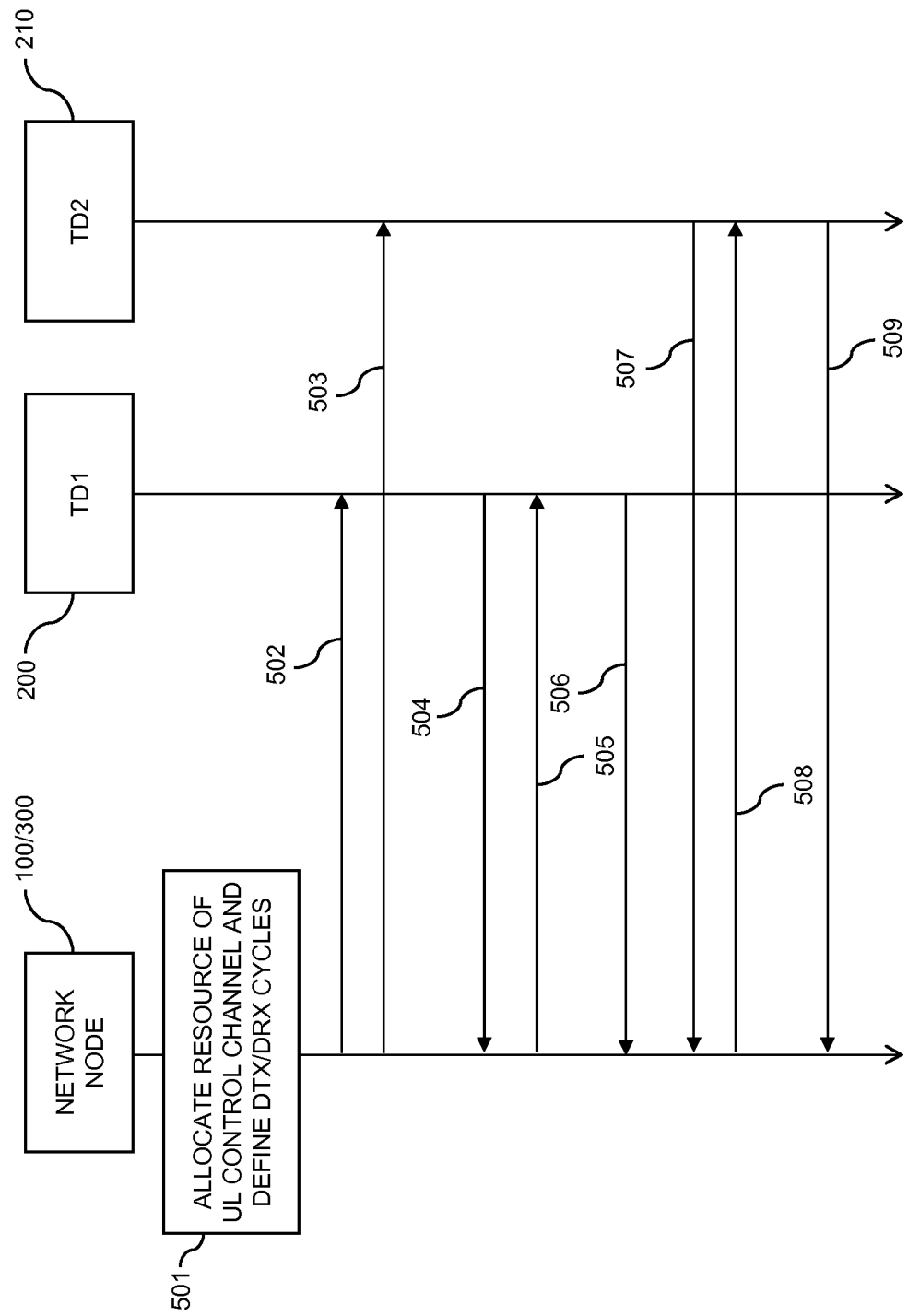
FIG. 5 shows a timing diagram for illustrating further exemplary procedures according to an embodiment of the invention.

The coordination of DTX/DRX cycles can be used to avoid or reduce overlap between the active periods of the DTX/DRX cycles. In this case, potential collisions between different terminal devices sharing the same resource of the UL control channel can be further avoided by applying a time sharing principle. An example of corresponding procedures is illustrated in FIG. 5. The procedures of FIG. 5 involve a network node, e.g., the BS 100 or the control node 300, the terminal device 200, and the further terminal device 210. It is assumed that the network node is responsible for allocating resources to be used for data transmission to or from the terminal devices 200, 210 and further also controls the respective DTX/DRX cycles of the terminal devices 200, 210.

At step 501, the network node 100/300 allocates a resource of an UL control channel to both the terminal device 200 and to the terminal device 210. The resource may for example be defined in terms of a timeslot, one or more frequencies or frequency bands, a phase rotation, and/or a code sequence to be used for transmission on the UL control channel. Further, the network node 100/300 also defines the respective DTX/DRX cycles of the terminal devices 200, 210. This may be accomplished in such a way that the active times of the respective DTX/DRX cycles are non-overlapping or at least overlap is avoided as far as possible. Moreover, as in the procedures of FIG. 3, the network node 100/300 may also assign a shared identifier to both the terminal device 200 and to the further terminal device 210. The shared identifier may be a shared C-RNTI.

By message 502, the network node 100/300 may inform the terminal device 200 of the allocated resource of the UL control channel. Similarly, the network node 100/300 may use message 503 to inform the further terminal 210 of the allocated resource of the UL control channel. The messages 502, 503 can for example be RRC messages. The messages 502, 503 may further be used to configure the respective DTX/DRX cycles in the terminal devices 200, 210.

With message 504, the terminal device 200 may then send a scheduling request to the network node 100/300. This is accomplished on the resource allocated at step 501 and during the active time of the DTX/DRX cycle configured for the terminal device 200. The scheduling request of message 504 is received by the network node 100/300. If the message 504 is transmitted in a non-overlapping part of the active periods of the respective DTX/DRX cycles of the terminal devices 200, 210, the network node 100/300 can utilize the timing of the message 504 to identify the terminal device 200 as source of the message 504.

In response to the received scheduling request, the network node 100/300 sends a message 505 including an UL grant. Assuming that the terminal device 200 was identified as the source of the message 504 and the scheduling request, the network node 100/300 addresses the message 505 to the terminal device 200. If the source of the message 504 could not be identified on the basis of the timing of the message 504 alone, the network node 100/300 may use the shared identifier to address the message 505 to both the terminal device 200 and to the further terminal device 210.

Upon receiving the UL grant, the terminal device 200 may send UL data 506 to the network node 100/300. This is accomplished by utilizing resources of an UL data channel as indicated by the UL grant. The UL data channel may for example be a PUSCH.

With message 507, the further terminal device 210 may then send a further scheduling request to the network node 100/300. This is accomplished on the resource allocated at step 501 and during the active time of the DTX/DRX cycle configured for the further terminal device 210. The scheduling request of message 507 is received by the network node 100/300. If the message 507 is transmitted in a non-overlapping part of the active periods of the respective DTX/DRX cycles of the terminal devices 200, 210, the network node 100/300 can utilize the timing of the message 507 to identify the terminal device 210 as source of the message 507.

In response to the received scheduling request, the network node 100/300 sends a message 508 including a further UL grant. Assuming that the terminal device 210 was identified as the source of the message 507 and the scheduling request, the network node 100/300 addresses the message 508 to the terminal device 210. If the source of the message 507 could not be identified on the basis of the timing of the message 507 alone, the network node 100/300 may use the shared identifier to address the message 508 to both the terminal device 200 and to the further terminal device 210.

Upon receiving the further UL grant, the terminal device 210 may send UL data 509 to the network node 100/300. This is accomplished by utilizing resources of the UL data channel as indicated by the further UL grant.

If the UL grant or the further UL grant is addressed to both the terminal device 200 and to the further terminal device 210, similar procedures as explained in connection with FIG. 3 may be used to resolve the source of the UL data transmitted in accordance with the UL grant.

With the above coordination of DRX/DTX cycles, collisions on the shared resource of the UL control channel can be avoided. Further, by coordination of the DRX cycles, the terminal devices can also share the same resource or resources for sending Sounding Reference Signals (SRS), which are typically transmitted only during the active time of the DRX cycle.

Figure 6:
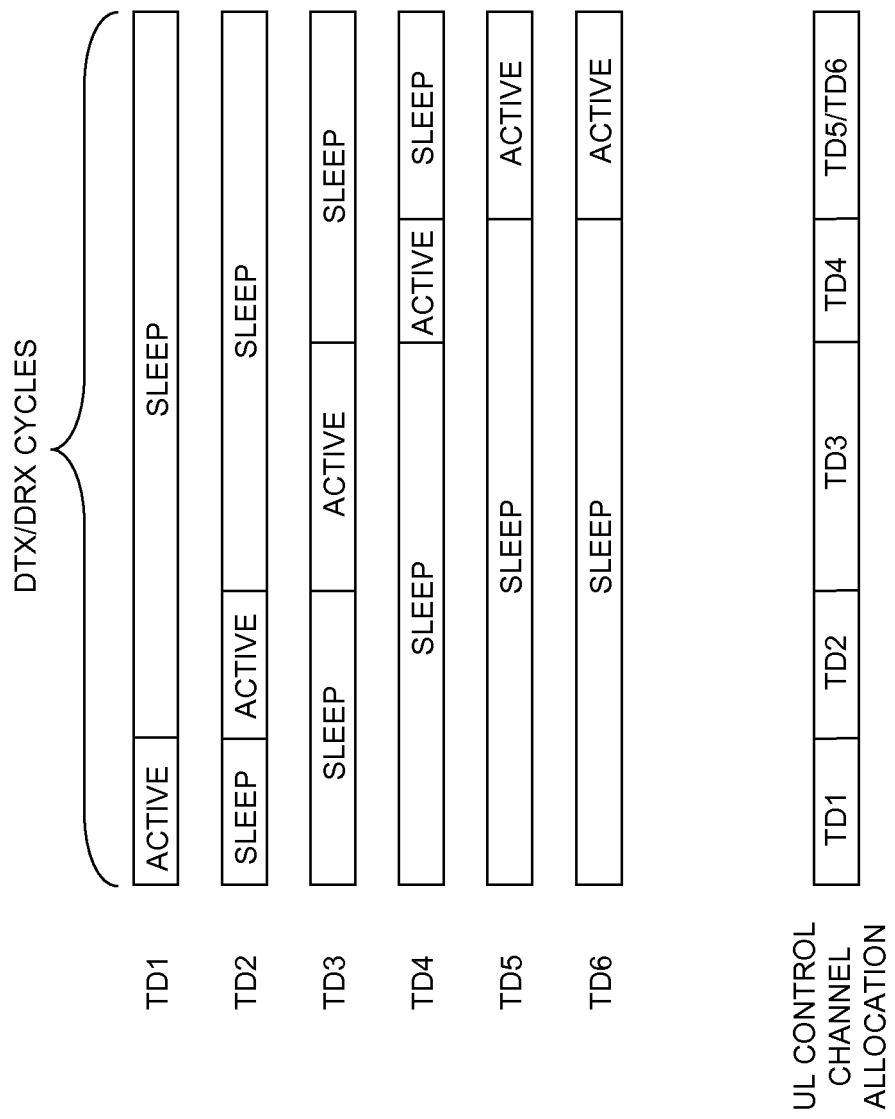
FIG. 6 shows an exemplary scenario involving coordination of DTX/DRX cycles between different terminal devices.

FIG. 6 illustrates an exemplary scenario in which DTX/DRX cycles are coordinated between multiple terminal devices, referred to as TD1, TD2, TD3, TD4, TD5, TD6. As can be seen, the active times of the terminal devices TD1, TD2, TD3, TD4, TD5 do not overlap, nor do the active times of the terminal devices TD1, TD2, TD3, TD4, TD6. An overlap is however present between the terminal devices TD5 and TD6. Accordingly, for the terminal devices TD1, TD2, TD3, TD4, and either TD5 or TD6, the source of scheduling requests can be resolved on the basis of the timing of the scheduling request. For handling scheduling requests from the terminal devices TD5 and TD6, the above-mentioned concepts on the basis of the shared identifier may be applied.

In the above concepts involving coordination of DTX/DRX cycles, it is further possible to combine the periodicities of the DRX cycle and SRS cycle to achieve an extended SRS period. For this purpose, SRS cycles and DRX cycles may run separately from each other, with SRS transmissions occurring only during the active time of the DRX cycle. If for example the SRS cycle period is set to 10 ms and the DRX cycle period to 2048 ms, with an active time duration of 1 ms, this would result in a SRS cycle period of 2048× 5=10240 ms. This allows for efficiently sharing the resources for the SRS transmissions between a large number of terminal devices.

The SRS transmissions can be used by the mobile network, e.g., by the BS 100 or the control node 300, to monitor presence and/or mobility of a certain terminal device. This can in turn be useful for detecting failure or sabotage of the terminal device, e.g., a seldom visited terminal device. In this respect, a favorable property of a SRS is that it is transmitted over only a single symbol, which means that the transmitter circuitry of the terminal device does not need to be active for an entire subframe in order to perform the SRS transmission, which allows for a high energy efficiency.

Figure 7:
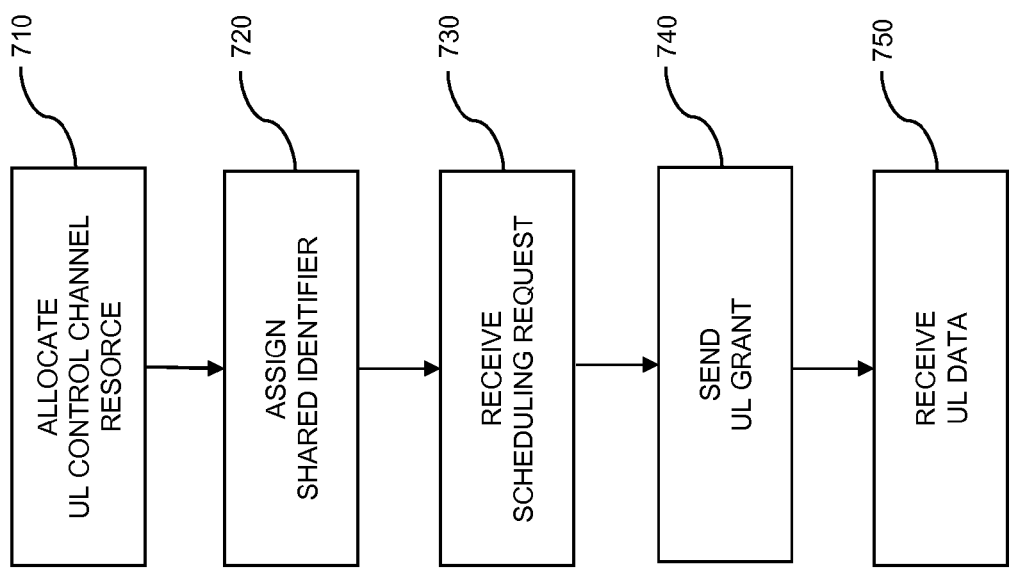
FIG. 7 shows a flowchart for illustrating a method according to an embodiment of the invention.

FIG. 7 shows a flowchart for illustrating a method. The method of FIG. 7 may be used for implementing data transmission between a mobile network and a terminal device using the above-mentioned concepts. The method of FIG. 7 may be implemented in a node of the mobile network, e.g., in the BS 100 or in the control node 300.

At step 710, the node allocates a resource of a UL control channel, also referred to as a UL control channel resource, to the terminal device and to at least one further terminal device, e.g., to the above-mentioned terminal devices 200, 210. At least one of the terminal device and the further terminal device may be in DTX mode. Depending on the implementation of the mobile network, the UL control channel may for example be a PUCCH or an E-DPCCH. The resource may for example be defined in terms of a timeslot, a frequency band, a phase rotation and/or a code sequence.

At step 720, the node assigns a shared identifier to both the terminal device and the further terminal device. The shared identifier may be a C-RNTI. In some scenarios, the shared identifier may be an SPS-CRNTI.

At step 730, the node receives a scheduling request from the terminal device. This is accomplished using the allocated UL control channel resource.

At step 740, in response to receiving the scheduling request of step 730, the node sends a UL grant. This may be accomplished on a DL control channel. By the shared identifier, the UL grant is addressed to the terminal device and to the further terminal device.

At step 750, the node receives UL data from the terminal device. This is accomplished on UL resources indicated by the UL grant, e.g., resources of an UL data channel. The UL data may include an identifier which indicates whether the UL data are from the terminal device or from the further terminal device. This identifier may for example be a C-RNTI, in particular a cell-unique C-RNTI, i.e., a C-RNTI which is unique within the cell of the terminal device. The node may then use the identifier to identify the terminal device as source of the UL data.

Alternatively or in addition, the node may receive the UL data on the basis of a phase rotation pattern of demodulation reference symbols which indicates whether the UL data are from the terminal device or from the further terminal device. The node may then use the phase rotation pattern to identify the terminal device 200 as source of the UL data.

Alternatively or in addition, the node may receive the UL data on the basis of a scrambling sequence which indicates whether the uplink data are from the terminal device or from the further terminal device. The node may then use the scrambling sequence to identify the terminal device as source of the UL data.

If the terminal device and the further terminal device use DTX, the node may configure the terminal device with a first DTX cycle, defining an active time and a sleep period of the terminal device, and configure the further terminal device with a second DTX cycle, defining an active time and a sleep period of the further terminal device. This may be accomplished in such a way that the active time of the first DTX cycle does not overlap the active time of the second DTX cycle, e.g., as explained in connection with FIGS. 5 and 6.

Figure 8:
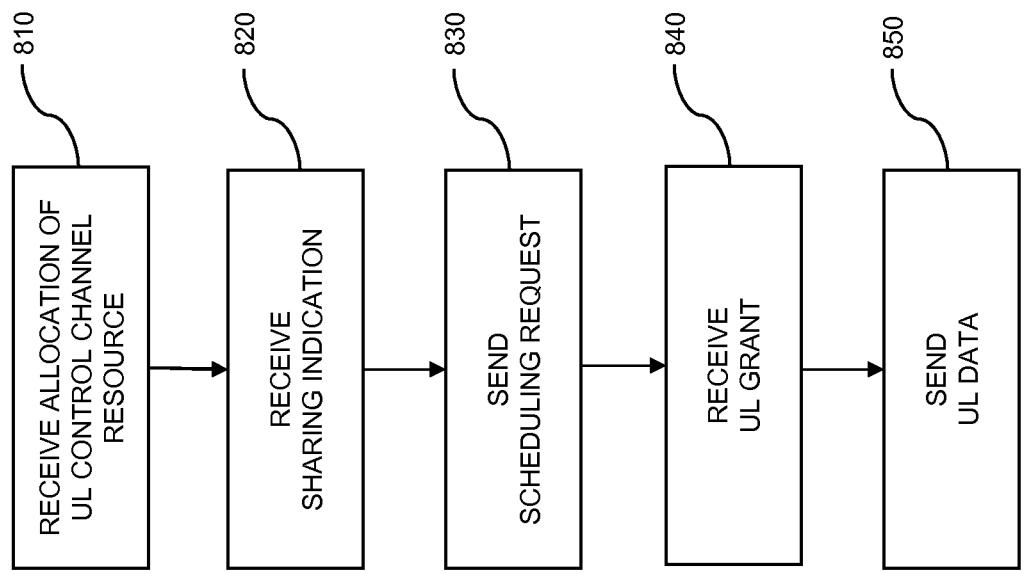
FIG. 8 shows a flowchart for illustrating a further method according to an embodiment of the invention.

FIG. 8 shows a flowchart for illustrating a method. The method may be used for implementing data transmission between a mobile network and a terminal device using the above-mentioned concepts. The method of FIG. 8 may be implemented in a terminal device, e.g., in the terminal device 200 or the terminal device 210.

At step 810, the terminal device receives an allocation of a resource of an UL control channel, i.e., an UL control channel resource, from the mobile network.

At step 820, the terminal device receives an indication that the UL control channel resource is additionally allocated to the at least one further terminal device. This indication may for example be included in message 302 of FIG. 3.

At step 830, the terminal device sends a scheduling request to the mobile network. This is accomplished using the UL control channel resource as allocated in step 810.

At step 840, in response to the scheduling request, the terminal device receives an UL grant. The UL grant is addressed to the terminal device by a shared identifier assigned both to the terminal device and to the further terminal device. The terminal device may be notified of the assignment of the shared identifier by control signaling from the mobile network, e.g., through message 302 of FIG. 3. The shared identifier may be a C-RNTI. In some scenarios, the shared identifier may be an SPS-C-RNTI.

At step 850, the terminal device may send UL data to the mobile network. This may is accomplished using UL resources indicated by the UL grant. The UL data may include an identifier which indicates whether the UL data are from the terminal device or from the further terminal device. This identifier may for example be a C-RNTI, in particular a cell-unique C-RNTI, i.e., a C-RNTI which is unique within the cell of the terminal device. The mobile network may then use the identifier to identify the terminal device as source of the UL data.

Alternatively or in addition, the terminal device may send the UL data on the basis of a phase rotation pattern of demodulation reference symbols which indicates whether the UL data are from the terminal device or from the further terminal device. The mobile network may then use the phase rotation pattern to identify the terminal device as source of the UL data.

Alternatively or in addition, the terminal device may send the UL data on the basis of a scrambling sequence which indicates whether the uplink data are from the terminal device or from the further terminal device. The mobile network may then use the scrambling sequence to identify the terminal device as source of the UL data.

Figure 9:
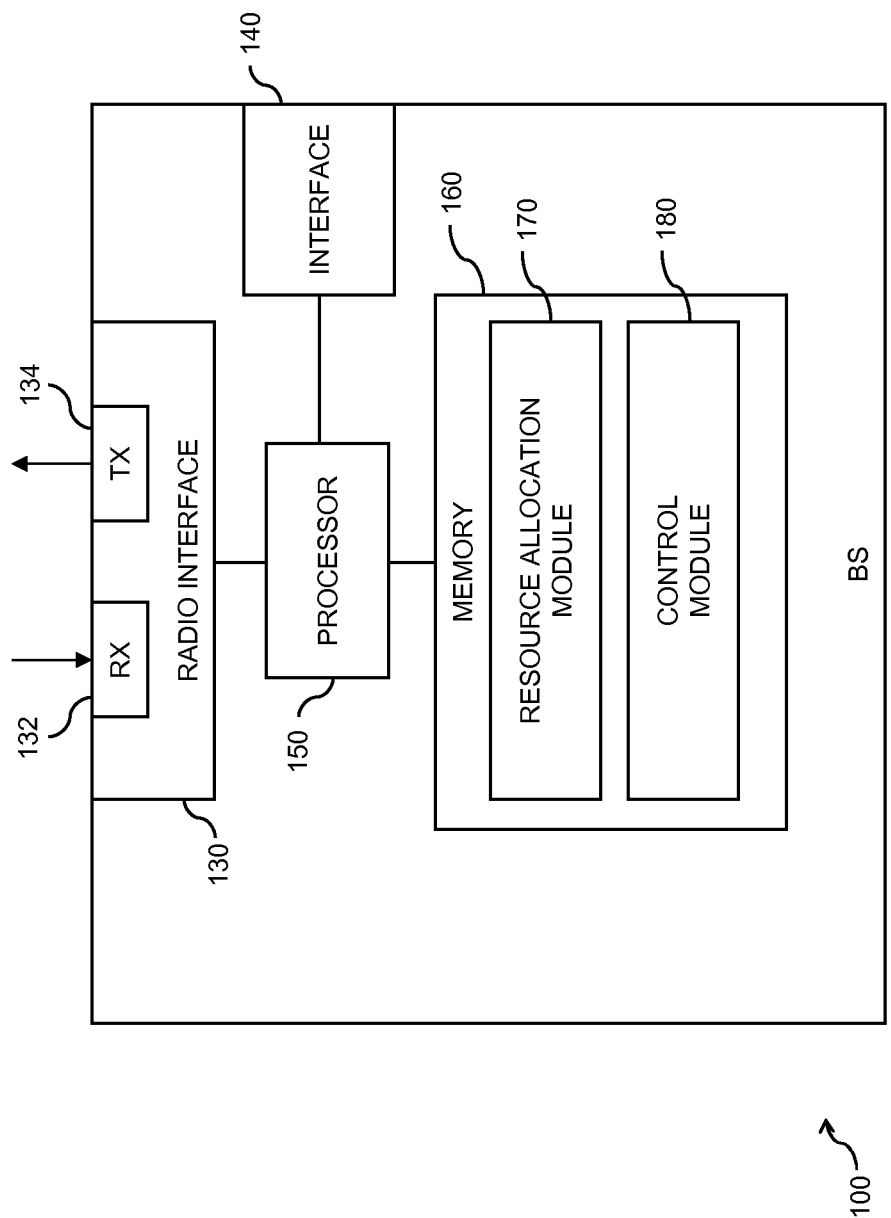
FIG. 9 schematically illustrates a base station according to an embodiment of the invention.

FIG. 9 schematically illustrates exemplary structures for implementing the above-described concepts in the BS 100.

In the illustrated structure, the BS 100 includes a radio interface 130 for data transmission to or from the terminal device 200. It is to be understood that for implementing transmitter (TX) functionalities the radio interface 130 may include one or more transmitters 134, and that for implementing receiver (RX) functionalities the radio interface 130 may include one or more receivers 132. The radio interface 130 may in particular be configured to transmit the above mentioned downlink control channel, i.e., be used for controlling data transmission to or from the terminal device 200, and the above-mentioned PCH. In the above-mentioned LTE scenario, the radio interface 130 may correspond to the LTE-Uu interface of the E-UTRAN. In the above-mentioned UMTS scenario, the radio interface 130 may correspond to the Uu interface of the Universal Terrestrial Radio Access Network (UTRAN). Further, the BS 100 may include a control interface 140 for communicating with other nodes of the mobile network, e.g., the control node 300 of FIG. 1.

Further, the BS 100 includes a processor 150 coupled to the interfaces 130, 140 and a memory 160 coupled to the processor 150. The memory 160 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 160 includes suitably configured program code to be executed by the processor 150 so as to implement the above-described functionalities of the BS 100. More specifically, the memory 160 may include a resource allocation module 170 for accomplishing the above-described allocation of the shared UL control channel resource and the assignment of the shared identifier to the terminal devices sharing the UL control channel resource. Further, the memory 160 may include a control module 180 for controlling transmissions to or from the BS 100 in the above-described manner.

It is to be understood that the structure as illustrated in FIG. 9 is merely schematic and that the BS 100 may actually include further components which, for the sake of clarity, have not been illustrated, e.g., further interfaces or additional processors. Also, it is to be understood that the memory 160 may include further types of program code modules, which have not been illustrated. For example, the memory 160 may include program code modules for implementing typical functionalities of a BS, e.g., known functionalities of an eNB or NB. According to some embodiments, also a computer program product may be provided for implementing concepts according to embodiments of the invention, e.g., a computer-readable medium storing the program code and/or other data to be stored in the memory 160.

Figure 10:
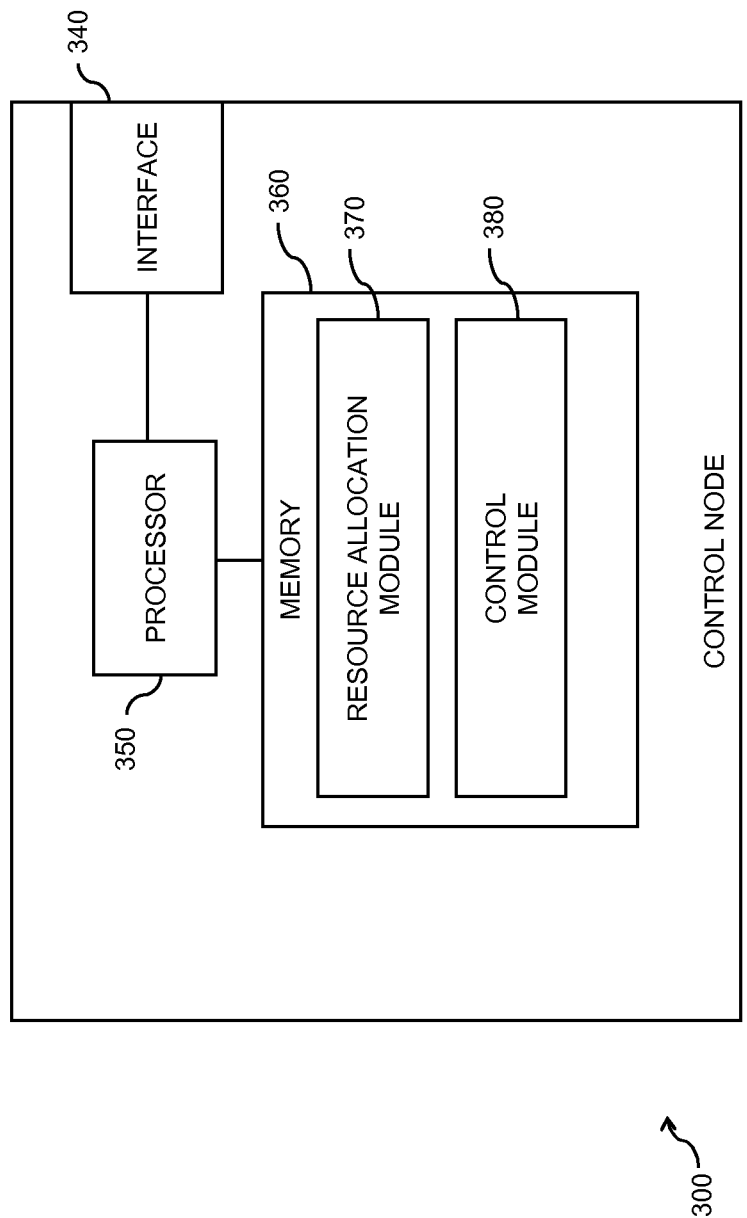
FIG. 10 schematically illustrates a control node according to an embodiment of the invention.

FIG. 10 schematically illustrates exemplary structures for implementing the above-described concepts in the control node 300.

In the illustrated structure, the control node 300 a control interface 340 for communicating with other nodes of the mobile network, e.g., the BS 100 of FIG. 1. The control interface may be used for controlling data transmission to or from the terminal device 200.

Further, the control node 300 includes a processor 350 coupled to the control interface 340 and a memory 360 coupled to the processor 350. The memory 360 may include a ROM, e.g., a flash ROM, a RAM, e.g., a DRAM or SRAM, a mass storage, e.g., a hard disk or solid state disk, or the like. The memory 360 includes suitably configured program code to be executed by the processor 350 so as to implement the above-described functionalities of the control node 300. More specifically, the memory 360 may include a resource allocation module 370 for accomplishing the above-described allocation of the shared UL control channel resource and the assignment of the shared identifier to the terminal devices sharing the UL control channel resource. Further, the memory 360 may include a control module 380 for controlling transmissions to or from the control node 300 in the above-described manner.

It is to be understood that the structure as illustrated in FIG. 10 is merely schematic and that the control node 300 may actually include further components which, for the sake of clarity, have not been illustrated, e.g., further interfaces or additional processors. For example, the control node 300 may have an interface for sending and receiving user plane data to and from the BS 100. Also, it is to be understood that the memory 360 may include further types of program code modules, which have not been illustrated. For example, the memory 360 may include program code modules for implementing typical functionalities of a control node, e.g., known functionalities of an MME or RNC. According to some embodiments, also a computer program product may be provided for implementing concepts according to embodiments of the invention, e.g., a computer-readable medium storing the program code and/or other data to be stored in the memory 360.

Figure 11:
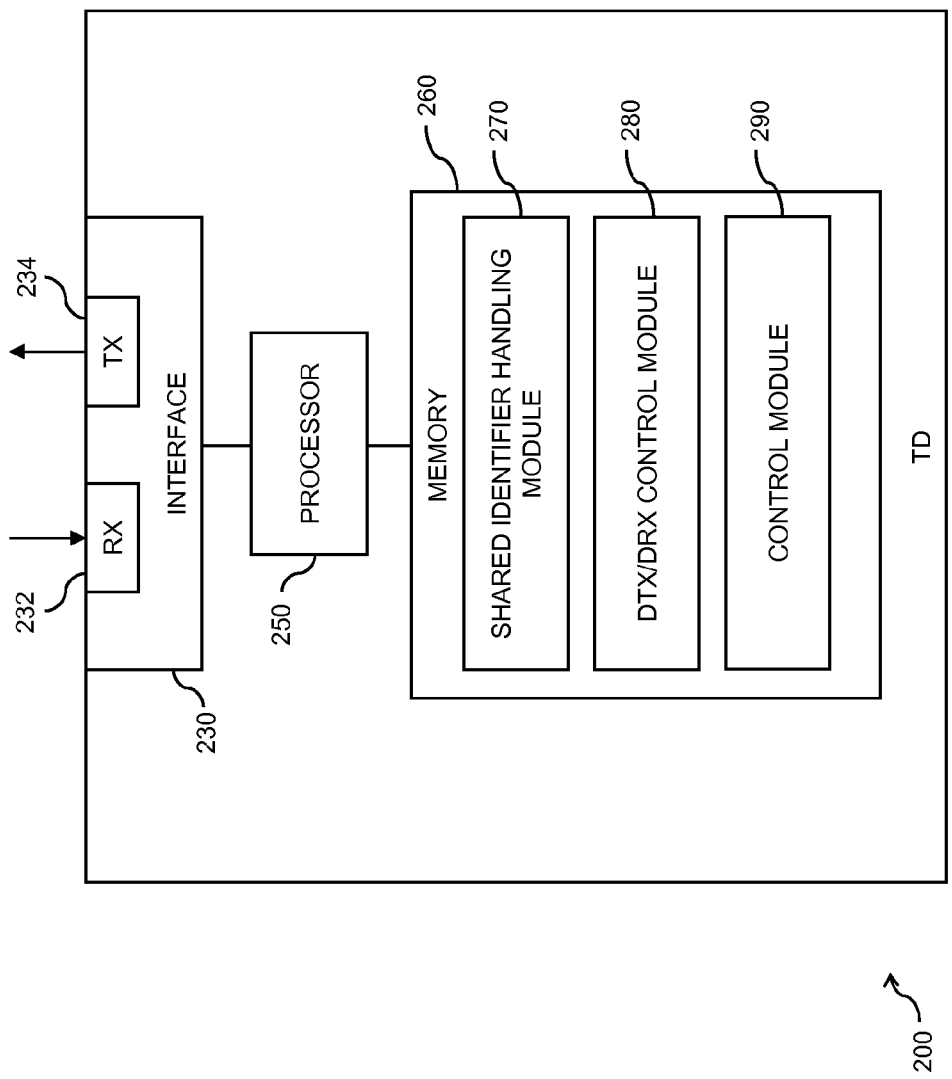
FIG. 11 schematically illustrates a terminal device according to an embodiment of the invention.

FIG. 11 schematically illustrates exemplary structures for implementing the above-described concepts in the terminal device 200. The terminal device 210 may be implemented in a similar way.

In the illustrated structure, the terminal device 200 includes a radio interface 230 for performing data transmission to or from a mobile network, e.g., via the BS 100. In particular, the radio interface 230 may be configured for performing transmissions on the above-mentioned UL control channel, e.g., transmissions of scheduling requests. Further, the radio interface 230 may be configured for performing transmissions of UL data, e.g., on the above-mentioned UL data channel. Still further, the radio interface 230 may be configured for receiving DL transmissions from the mobile network. For example, such DL transmissions may include UL grants. It is to be understood that for implementing transmitter (TX) functionalities the radio interface 230 includes one or more transmitters 234, and that for implementing receiver functionalities (RX) functionalities the radio interface 230 may include one or more receivers 232. In the above-mentioned LTE scenario, the radio interface 230 may correspond to the LTE-Uu interface of the E-UTRAN. In the above-mentioned UMTS scenario, the radio interface 230 may correspond to the UTRAN Uu interface.

Further, the terminal device 200 includes a processor 250 coupled to the radio interface 230 and a memory 260 coupled to the processor 250. The memory 260 may include a ROM, e.g., a flash ROM, a RAM, e.g., a DRAM or SRAM, a mass storage, e.g., a hard disk or solid state disk, or the like. The memory 260 includes suitably configured program code to be executed by the processor 250 so as to implement the above-described functionalities of the terminal device 200. More specifically, the memory 260 may include a shared identifier handling module for controlling the reception of UL grants addressed to the terminal device 200/210 using the shared identifier. Further, the memory 260 may include a DTX/DRX control module for controlling entering and leaving of the DTX and/or DRX sleep mode. Still further, the memory 260 may include a control module 290 for performing various control operations, e.g., controlling the terminal device 200/210 to perform UL transmissions or receive DL transmissions as described above.

It is to be understood that the structure as illustrated in FIG. 11 is merely schematic and that the terminal device 200 may actually include further components which, for the sake of clarity, have not been illustrated, e.g., further interfaces or additional processors. Also, it is to be understood that the memory 260 may include further types of program code modules, which have not been illustrated. For example, the memory 260 may include program code modules for implementing typical functionalities of a terminal device or program code of one or more applications to be executed by the processor 250. According to some embodiments, also a computer program product may be provided for implementing concepts according to embodiments of the invention, e.g., a computer-readable medium storing the program code and/or other data to be stored in the memory 260.

As can be seen, the concepts as explained above allow for multiple terminal devices to efficiently share resources of the UL control channel. Through the resource sharing, shortage of UL control channel resources can be avoided. This is specifically beneficial when maintaining a large number of terminal devices in connected mode, thereby avoiding repeated transitions between connected mode and idle mode, which in turn allows for saving radio resources, reducing control plane overhead, and reducing energy consumption of the terminal devices. Repeated random access procedures by the terminal devices can be avoided, again allowing for saving radio resources, reducing control plane overhead, and reducing energy consumption of the terminal devices. A further observation is that benefits of the concepts tend to increase with longer duration of UL synchronization of the terminal devices, i.e., the longer the timing advance value of the terminal device can be kept without feedback from UL transmissions. Longer timing advance timeouts may be configured for stationary or slowly moving terminal devices. In order to efficiently utilize such features, knowledge of the low or non-existent mobility of the terminal device or a possibility to detect the mobility of the terminal device may be provided, e.g., through timing advance value monitoring, Doppler shift measurements, GPS or Galileo measurements, measurements using positioning mechanisms in the cellular network or preconfigured UE properties, e.g., in the form of a UE category or UE capability.

It is to be understood that the examples and embodiments as explained above are merely illustrative and susceptible to various modifications. For example, the concepts could be used in types of mobile network which differ from the above-mentioned examples of an LTE mobile network or UMTS mobile network, e.g., on the basis of Wideband Code Division Multiple Access (WCDMA). Also, the concepts may be used not only to support MTC terminal devices but also other types of UE. Further, it is to be understood that the above concepts may be implemented by using correspondingly designed software in existing mobile network nodes or terminal devices, or by using dedicated hardware of such mobile network nodes or terminal devices.

The invention claimed is:

1. A method of data transmission between a mobile network and a terminal device, the method comprising:
 a node of the mobile network allocating an uplink control channel resource to the terminal device and to a further terminal device;
 the node assigning a shared identifier to both the terminal device and the further terminal device;
 using the allocated uplink control channel resource, the node receiving a scheduling request from the terminal device;
 in response to receiving the scheduling request, the node sending an uplink grant to both the terminal device and the further terminal device, the uplink grant being addressed by the shared identifier to both the terminal device and to the further terminal device at a same time; and
 the node receiving uplink data from the terminal device on uplink resources indicated by the uplink grant.

2. The method according to claim 1, wherein the uplink data comprise an identifier which indicates whether the uplink data are from the terminal device or from the further terminal device.

3. The method according to claim 1, wherein the uplink data are received on the basis of a phase rotation pattern of demodulation reference symbols which indicates whether the uplink data are from the terminal device or from the further terminal device.

4. The method according to claim 1, wherein the uplink data are received on the basis of a scrambling sequence which indicates whether the uplink data are from the terminal device or from the further terminal device.

5. The method according to claim 1, wherein the shared identifier is a cell radio network temporary identifier.

6. The method according to claim 1, wherein at least one of the terminal device and the further terminal device is in discontinuous transmission mode.

7. The method according to claim 6, comprising:
 the node configuring the terminal device with a first discontinuous transmission cycle defining an active time and a sleep period of the terminal device; and
 the node configuring the further terminal device with a second discontinuous transmission cycle defining an active time and a sleep period of the further terminal device;
 wherein the active time of the first discontinuous transmission cycle does not overlap the active time of the second discontinuous transmission cycle.

8. A method of data transmission between a mobile network and a terminal device, the method comprising:
- the terminal device receiving an allocation of an uplink control channel resource from the mobile network;
- the terminal device receiving an indication that the uplink control channel resource is additionally allocated to a further terminal device;
- using the allocated uplink control channel resource, the terminal device sending a scheduling request to the mobile network; and
- in response to the scheduling request, the terminal device receiving an uplink grant addressed to the terminal device by a shared identifier assigned both to the terminal device and to the further terminal device at a same time, the uplink grant being transmitted to both the terminal device and the further terminal device by a single transmitted uplink grant.

9. The method according to claim 8, comprising:
- on the uplink resources indicated by the uplink grant, the terminal device sending uplink data to the mobile network.

10. The method according to claim 9, wherein the uplink data comprise an identifier which indicates whether the uplink data are from the terminal device or from the further terminal device.

11. The method according to claim 9, wherein the uplink data are sent on the basis of a phase rotation pattern of demodulation reference symbols which indicates whether the uplink data are from the terminal device or from the further terminal device.

12. The method according to claim 9, wherein the uplink data are sent on the basis of a scrambling sequence which indicates whether the uplink data are from the terminal device or from the further terminal device.

13. The method according to claim 8, wherein the shared identifier is a cell radio network temporary identifier.

14. A network node comprising:
- a radio interface configured to provide data transmission between a mobile network and a terminal device; and
- a processor configured to control the network node to perform operations comprising:
- allocating an uplink control channel resource to the terminal device and to a further terminal device,
- assigning a shared identifier to both the terminal device and the further terminal device,
- using the allocated uplink control channel resource, receiving a scheduling request from the terminal device,
- in response to receiving the scheduling request, sending an uplink grant to both the terminal device and the further terminal device, the uplink grant being addressed by the shared identifier to both the terminal device and to the further terminal device at a same time, and
- receiving uplink data from the terminal device on uplink resources indicated by the uplink grant.

15. The network node according to claim 14, wherein the uplink data comprise an identifier which indicates whether the uplink data are from the terminal device or from the further terminal device.

16. A terminal device, comprising:
- a radio interface configured to provide data transmission between a mobile network and the terminal device; and
- a processor configured to control the terminal device to perform operations comprising:
- receiving an allocation of an uplink control channel resource from the mobile network,
- receiving an indication that the uplink control channel resource is additionally allocated to a further terminal device,
- using the allocated uplink control channel resource, sending a scheduling request to the mobile network, and
- in response to the scheduling request, receiving an uplink grant addressed to the terminal device by a shared identifier assigned both to the terminal device and to the further terminal device at a same time, the uplink grant being transmitted to both the terminal device and the further terminal device by a single transmitted uplink grant.

17. The terminal device according to claim 16, wherein the processor sends uplink data to the mobile network on uplink resources indicated by the uplink grant.

18. The method according to claim 1, wherein the uplink data is received from the terminal device based on a phase rotation pattern or a scrambling sequence which indicates whether the uplink data is from the terminal device or from the further terminal device, and
- wherein the phase rotation pattern or the scrambling sequence is derived from a cell-unique C-RNTI.

19. The method according to claim 1,
- wherein a first phase rotation pattern or a first scrambling sequence is associated with the terminal device and a second phase rotation pattern, different from the first phase rotation, or a second scrambling sequence, different from the first scrambling sequence is associated with the further terminal device.

20. The method according to claim 7, wherein the uplink grant being addressed by the shared identifier to the terminal device and to the further terminal device is not monitored during the sleep period of the further terminal device but the further terminal device is in connected mode.

21. The method according to claim 1, further comprising:
- the node receiving uplink data comprising a buffer status report (BSR) on uplink resources indicated by the uplink grant from the further terminal device if the further terminal device does not have data to send.

22. The method according to claim 21,
- wherein the uplink grant addressed by the shared identifier comprises a flag indicating to the further terminal device to suppress sending the buffer status report (BSR) to the node.

* * * * *